(12) United States Patent
Turay (10) Patent No.: US 10,443,995 B2
(45) Date of Patent: Oct. 15, 2019

(54) DEVICE FOR INSPECTING AND MEASURING SEWER/UTILITY STRUCTURES

(71) Applicant: Shane S. Turay, Buchanan, MI (US)

(72) Inventor: Shane S. Turay, Buchanan, MI (US)

( * ) Notice: Subject to any disclaimer, the term of this patent is extended or adjusted under 35 U.S.C. 154(b) by 348 days.

(21) Appl. No.: 15/258,273

(22) Filed: Sep. 7, 2016

(65) Prior Publication Data

US 2017/0074631 A1    Mar. 16, 2017

Related U.S. Application Data

(60) Provisional application No. 62/283,959, filed on Sep. 16, 2015.

(51) Int. Cl.
| | | |
|---|---|---|
| *G01B 3/00* | (2006.01) | |
| *G01B 21/04* | (2006.01) | |
| *G01B 5/00* | (2006.01) | |

(52) U.S. Cl.
CPC ........... *G01B 3/002* (2013.01); *G01B 5/0004* (2013.01); *G01B 21/047* (2013.01)

(58) Field of Classification Search
CPC ..... G01B 21/047; G01B 3/002; G01B 5/0004
USPC .................................................... 33/542, 544
See application file for complete search history.

(56) References Cited

U.S. PATENT DOCUMENTS

| | | | | |
|---|---|---|---|---|
| 3,060,377 A * | 10/1962 | Schmidt | ................ | E21B 47/082 324/220 |
| 3,635,396 A * | 1/1972 | Palfi | ........................ | G06G 1/04 235/70 R |
| 4,419,829 A * | 12/1983 | Miller | ....................... | G01B 5/12 33/501.08 |
| 5,084,764 A * | 1/1992 | Day | ....................... | G01M 3/005 348/84 |
| 5,337,613 A * | 8/1994 | Kovari | ..................... | G01B 5/30 73/784 |
| 5,377,421 A * | 1/1995 | Isler | ......................... | G01B 3/46 33/501.3 |
| 5,457,288 A * | 10/1995 | Olsson | .................. | H01B 7/183 174/105 R |
| 5,485,681 A * | 1/1996 | Hitchcock | ............... | G01F 23/04 33/722 |
| 5,629,480 A * | 5/1997 | Herget | .................... | E21B 47/01 166/66 |
| 6,065,218 A * | 5/2000 | Edwards | ................. | E21B 47/00 33/302 |
| 6,067,846 A * | 5/2000 | Hill | .......................... | G01N 3/44 73/82 |
| 6,076,407 A * | 6/2000 | Levesque | ............. | G01N 29/223 324/220 |
| 6,134,793 A * | 10/2000 | Sauers | .................... | F41G 1/467 124/87 |

(Continued)

*Primary Examiner* — Yaritza Guadalupe-McCall
(74) *Attorney, Agent, or Firm* — Price Heneveld LLP (57) ABSTRACT

An inspection apparatus configured to selectively couple to a receiver mount of a survey inspection assembly is disclosed. The inspection apparatus comprises an elongated body extending along a longitudinal axis from a proximal inspection portion to a distal inspection portion. The apparatus further comprises an inspection feature configured to slidably engage the longitudinal axis. The inspection feature is configured to extend a visual reference of at least one measurement reference disposed on the inspection apparatus.

15 Claims, 8 Drawing Sheets

(56) References Cited

U.S. PATENT DOCUMENTS

| | | | | |
|---|---|---|---|---|
| 6,490,805 B1* | 12/2002 | Forschler | ............... | G01B 3/46 33/542 |
| 8,061,053 B2* | 11/2011 | Gillan | ................. | E21B 47/08 33/544 |
| 9,066,446 B1* | 6/2015 | Olsson | ................. | H04N 5/2252 |
| 2002/0069546 A1* | 6/2002 | Claxton | ............. | E04F 21/0092 33/527 |
| 2005/0081396 A1* | 4/2005 | Coulombe | ............. | G01B 5/12 33/542 |
| 2005/0120569 A1* | 6/2005 | Butler | ..................... | G01B 3/20 33/203 |
| 2014/0192180 A1* | 7/2014 | Sooy | .................. | E21B 47/0002 348/85 |
| 2014/0278111 A1* | 9/2014 | Gerrie | ................. | E21B 47/0002 702/8 |
| 2016/0115781 A1* | 4/2016 | Douglas | ................. | E21B 47/08 33/544 |
| 2017/0074631 A1* | 3/2017 | Turay | ................. | G01B 21/047 |
| 2018/0066420 A1* | 3/2018 | Beck | ..................... | B08B 9/027 |

* cited by examiner

DEVICE FOR INSPECTING AND MEASURING SEWER/UTILITY STRUCTURES

CROSS-REFERENCE TO RELATED APPLICATION

This application claims priority to and the benefit under 35 U.S.C. § 119(e) of U.S. Provisional Patent Application No. 62/283,959 filed on Sep. 16, 2015, entitled "DEVICE FOR INSPECTING AND MEASURING SEWER/UTILITY STRUCTURES. INCLUDING BUT NOT LIMITED TO THE STRUCTURE ITSELF, PIPE SIZES, TYPES AND DEPTHS OF PIPES AND FLOWS WITH THE MAIN GOAL OF, BUT NOT LIMITED TO REDUCING THE NEED FOR CONFINED SPACE ENTRY BY PERSONNEL AND IMPROVING THE INSPECTION DATA QUALITY AND EFFICIENCY," the entire disclosure of which is hereby incorporated herein by reference.

TECHNOLOGICAL FIELD

The invention relates generally to the inspection and measurement of sewer/utility structures. More specifically, the invention relates to a modular measuring device that has components that are mounted to survey leveling rods or any other pole or extending device to provide tools that facilitate the inspection and measurement of features or material inside of a sewer/utility structure.

BACKGROUND

The gathering of pertinent data from existing sewer/utility structures is generally necessary to any civil infrastructure improvement or expansion project. This data gathering of sewer/utility structure information is unfortunately often complicated and made difficult by the dangers associated with entering the sewer/utility space with personnel. Often visual obstructions that are inherent with the common configuration of sewer/utility structures add to the complexity of such data gathering. For these and other reasons the quality and thoroughness of the inspection data is often very poor and plagued with inaccuracies and missing data.

Accordingly, there exist a need for a method and device that can be used for all types of sewer/utility structures. One that is adaptable to the plethora of different styles and configurations of sewer/utility structures.

BRIEF SUMMARY

In one aspect, the disclosure provides for an inspection apparatus configured to selectively couple to a receiver mount of a survey inspection assembly is disclosed. The inspection apparatus comprises an elongated body extending along a longitudinal axis from a proximal inspection portion to a distal inspection portion. The apparatus further comprises an inspection feature configured to slidably engage the longitudinal axis. The inspection feature is configured to extend a visual reference of at least one measurement reference disposed on the inspection apparatus.

In another aspect, the disclosure provides for an inspection assembly for inspection of a utility structure. The assembly comprises a receiver mount having an elongated body extending from a proximal base portion to a distal base portion. The receiver mount also forms a first latch mechanism proximate the distal end portion. An inspection apparatus extends along a longitudinal axis from a proximal inspection portion to a distal inspection portion and forms an engaging portion configured to selectively couple to the latch mechanism. The inspection apparatus comprises a plurality of protruding gauges extending substantially perpendicular to the longitudinal axis.

In yet another aspect, the disclosure provides for an inspection assembly for inspection of a utility structure is disclosed. The assembly comprises a receiver mount having an elongated body extending from a proximal base portion to a distal base portion. The receiver mount forms a latch mechanism proximate the distal base portion and comprises a hinge assembly configured to angle the proximal base portion of the elongated body relative to the distal base portion. The assembly further comprises an inspection apparatus extending along a longitudinal axis from a proximal inspection portion to a distal inspection portion and forming an engaging portion proximate the proximal inspection portion. The engaging portion is configured to selectively couple to the latch mechanism.

These and other features, advantages, and objects of the present invention will be further understood and appreciated by those skilled in the art by reference to the following specification, claims, and appended drawings.

These and other features and advantages of the present invention will become more readily appreciated as the same becomes better understood by reference to the following detailed description when considered in connection with the accompanying drawings, wherein:

DETAILED DESCRIPTION

Figure 1:
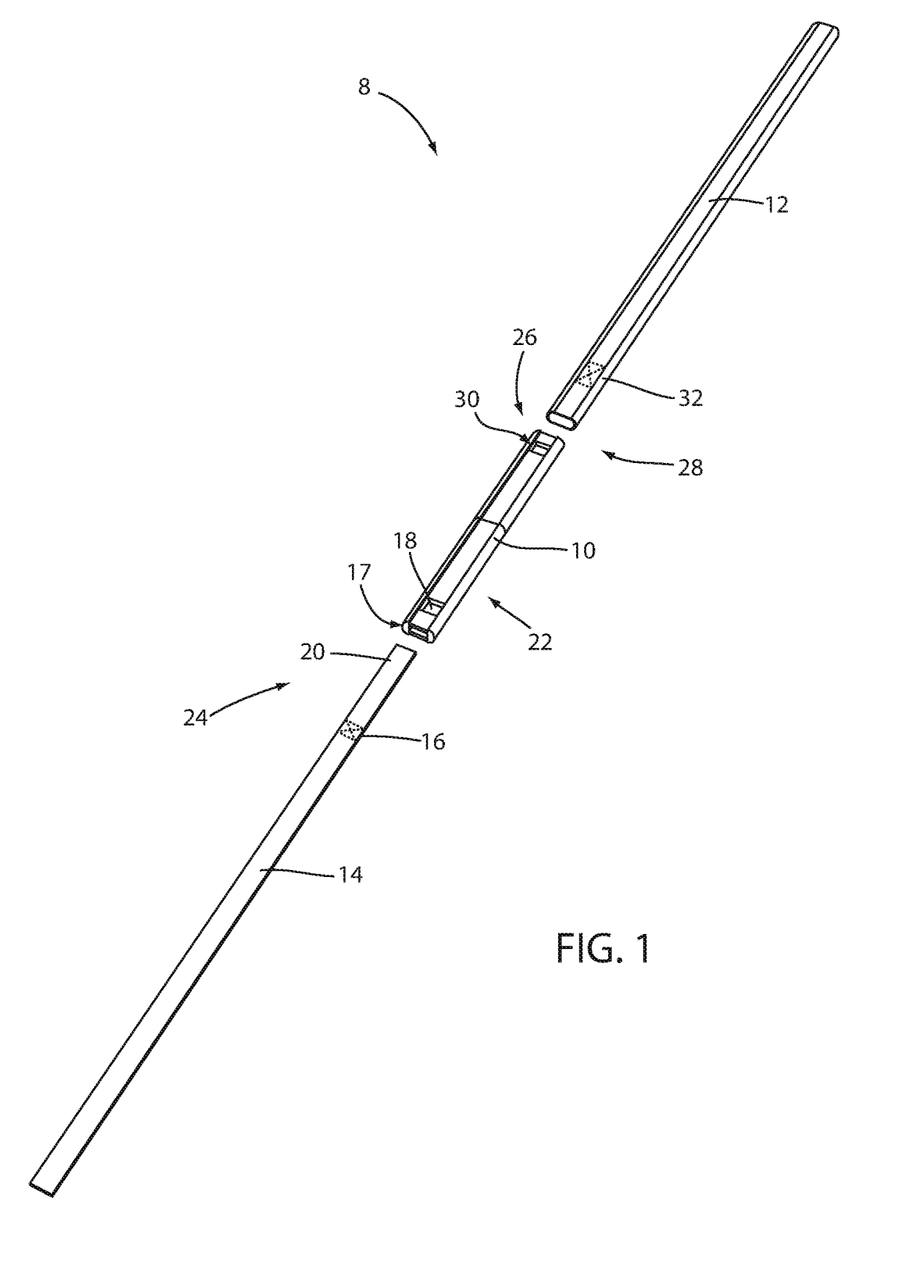
FIG. 1 is an perspective, exploded assembly view of an inspection assembly.

For purposes of description herein, the terms "upper," "lower," "right," "left," "rear," "front," "vertical," "horizontal," and derivatives thereof shall relate to the invention as oriented in FIG. 1. It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to the figures, wherein like numerals indicate like or corresponding parts throughout the several views, an inspection assembly 8 is demonstrated. The inspection assembly 8 may comprise a base receiver mount generally shown at 10, a mounted rod is generally shown at 12 and a sample inspection/measurement apparatus shown at 14.

Referring to FIG. 1, an exemplary embodiment of the inspection assembly 8 is shown demonstrating the base receiver mount 10 and the inspection/measurement apparatus 14. The components of the inspection assembly 8 are shown separated from one another to make clear their parts. The apparatus 14 is detachably coupled to the base receiver mount 10 via an engaging end portion 16 configured to engage a receiving chamber 17 disposed proximate a first receiving latch 18 of the base receiver mount 10. A proximal end portion 20 of the inspection apparatus 14 may form the engaging end portion 16. The engaging end portion 16 may be configured to seat inside the receiving chamber 17 formed in a distal end portion 22 of the base receiver mount 10. In this configuration, the inspection apparatus 14 may be held in place by a first quick release latch mechanism 24 formed by the engaging end portion 16, the receiving chamber 17, and the first receiving latch 18.

The first latch mechanism 24 may be configured similar to a bayonet latch, buckle latch or button and spring latch. In this configuration, the first receiving latch 18 may correspond to a moving latch mechanism 18 and the first end portion 16 may correspond to a static latch point. At a proximal end portion 26, the base receiver mount 10 may be configured to mount to the leveling rod 12 by a second latch mechanism 28 formed by a second engaging latch 30 and a second receiving latch 32. The second latch mechanism 28 may be similar to the first latch mechanism 24. In some embodiments, the mounted rod 13 may correspond to a fiberglass leveling rod. For example, the mounted rod 13 may correspond to a SECO 25 foot fiberglass leveling rod (LR-STD).

Figure 2:
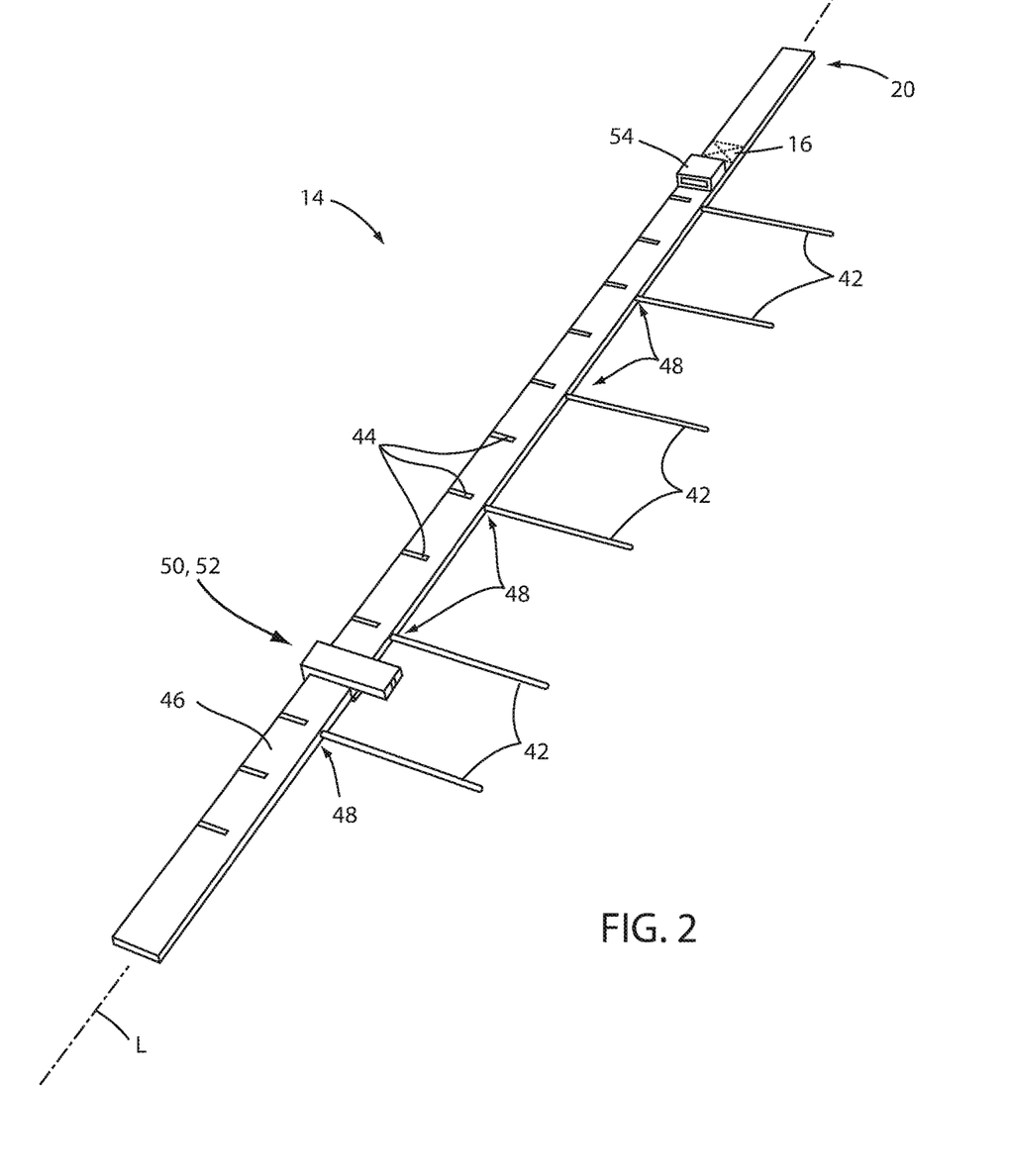
FIG. 2 is a perspective, partial assembly view of an inspection assembly.

Referring to FIG. 2, an exemplary embodiment of the inspection apparatus 14 of the inspection assembly 8 is shown. As demonstrated, the inspection apparatus 14 is meant to signify a variety of attachments that may be configured to attach to the base receiver mount 10. Accordingly, the specific configuration of the inspection apparatus 14 should not be limited to the depicted configuration. At the proximal end portion 20, the engaging end portion 16 is shown and may be configured to be received by the receiving chamber 17 proximate the first receiving latch 18 of the base receiver mount 10.

In an exemplary embodiment, the inspection apparatus 14 may comprise size gauges 42. The size gauges 42 may correspond to protrusions extending from the inspection apparatus 14 at evenly spaced intervals at locations corresponding to measurement values configured to identify an intended type of measurement. For example, the size gauges 42 may be set at nominal sewer pipe sizes for the main purpose of determining pipe size, flow depth, or other features at a distance. As previously discussed, such features may be challenging to identify due to lighting conditions and various obstructions that may be commonly encountered proximate an inspection site. Accordingly, the protruding configuration of the size gauges 42 may provide for improved visibility of a resulting measurement that may not otherwise be visible if the inspection apparatus 14 only had graduation lines 44.

The size gauges 42 may correspond to flexible whiskers or coils that may extend from a body 46 of the inspection apparatus 14. In an exemplary embodiment, the size gauges may engage receiving cavities 48 that may be formed by a material of the body 46. In this configuration, the size gauges 42 may be secured within receiving cavities 48 via an adhesive. The size gauges 42 may be formed of a non-corrosive PVC type material that may be partially flexible but configured to retain a shape. In this configuration, the size gauges 42 may correspond to significantly straight elongated protrusions extending perpendicular to a longitudinal axis L of the inspection apparatus 14.

The inspection apparatus 14 may further be configured to receive various additional features that may be mounted to the body 46. For example, a visible laser 50 may be slidably coupled to the inspection apparatus 14 such that the laser may be selectively positioned along the longitudinal axis A. The laser 50 may be similar to a construction layout line laser or a laser pointer. The laser pointer may provide for improved visibility and extension to objects that cannot be physically reached by the size gauges 42. In this configuration, the laser 50 may project a marker perpendicular to the longitudinal axis L such that objects out of reach of the inspection apparatus may be measure corresponding to the longitudinal position of the laser 50 along the longitudinal axis L.

In some embodiments, the laser 50 may be configured to self-level such that the marker may be projected at along a level plane with respect to gravity. In this configuration, the laser 50 may provide for added flexibility in measuring various objects that may be out of reach of the inspection assembly 8.

Additionally, the inspection apparatus 14 may comprise various additional inspection features that may provide for improved operation. For example, the inspection apparatus 14 may comprise a camera 52, which may be compact (e.g. a GoPro) and configured to capture video or image data proximate the inspection apparatus 14, which may be positioned at an extended distance from an operator manipulating the leveling rod 12 of the inspection assembly 8. The camera is demonstrated as the same feature as the laser 50 to demonstrate that the camera 52 may be combined with and/or correspond to an attachment interchangeable with the laser 50 and various other attachments. In some configurations, the camera 52 may be configured to transmit a video image to an electronic device such as an iPhone so that measurements could be obtained. Such video may be transmitted live from the camera 52 such that an operator can view the image or video data to more accurately measure an object.

The graduation marks 44 are shown at 10 for the main purpose of measuring. These marks may be an extension of the graduations of the leveling rod 12 and/or the base receiver mount 10 demonstrated in FIG. 1. In this configuration, the graduation marks 44 may serve as a reference for the size gauges 42, the laser 50, the camera 52, and various additional attachments that may be configured to be utilized with the inspection assembly 8. In this configuration, the inspection assembly may be configured to assist in obtaining depth measurements that may not otherwise be accessible or accurately identified when inspected.

In some embodiments, the inspection apparatus 14 may comprise a luminary 54. The luminary 54 may be similar to a waterproof LED light as shown at 11 for the main purpose of providing visible light in dark areas often found in underground or sealed structures. As demonstrated, the luminary 54 may be connected to the inspection apparatus 14 proximate the proximal end portion 20. In this configuration, light projected from the luminary 54 may be projected along the longitudinal axis L such that the graduation marks 44 and the size gauges 42 may be visible when the inspection apparatus is extended into a darkened area of inspection. Additionally, the luminary 54 may be combined with and/or correspond to an attachment interchangeable with the laser 50 or camera 52.

The body 46 of the inspection apparatus 14 may correspond to a disposable or semi-disposable material that may be replaced after use in hazardous conditions. For example, the body 46 may be formed of a semi-disposable material such as wood. In this configuration, the body of the inspection apparatus 14 may be disposed of after contamination from hazardous materials that are often present in sewer structures; for example human waste. The attachments (e.g. the laser 50, the camera 52, and the flashlight 54) may be removed and sanitized for later use. The body 46 being made of wood would also provide water level marks for easy identification of water levels by clearly displaying a contrast in color between the wet and dry wood along the longitudinal axis L. In some embodiments, the inspection apparatus 14 may also be flexible like a bow to allow for easier gauging of features such as sewer pipes that are offset from a vertical measuring plane. Such a configuration is discussed later in reference to FIG. 6B. Accordingly, the inspection apparatus 14 may correspond to an interchangeable attachment of the inspection assembly 8 that may be swapped to suit a particular application.

Figures 3A, 3B:
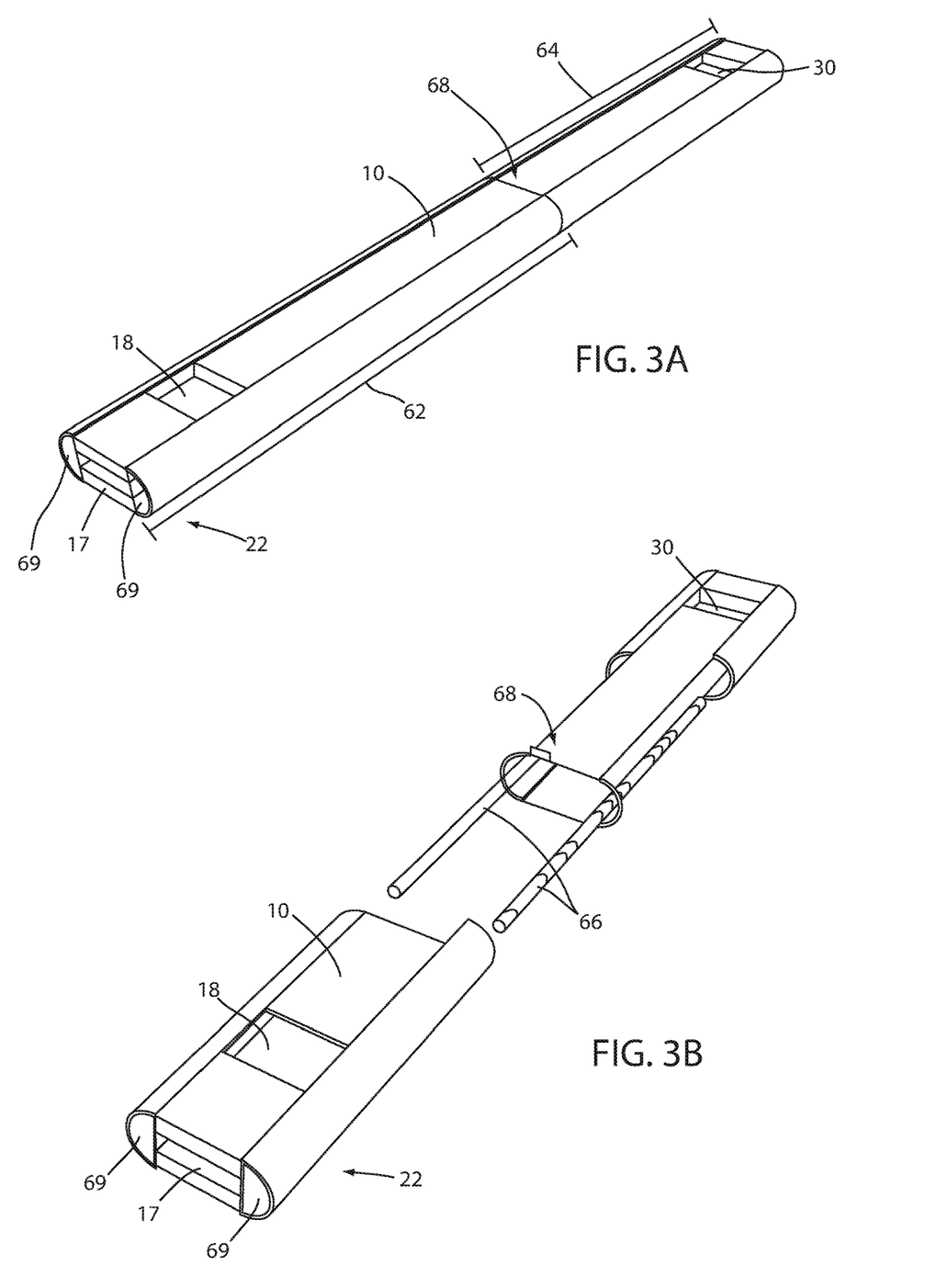
FIG. 3A is a perspective view of a base receiver mount of an inspection assembly.
FIG. 3B is an exploded, perspective view of a base receiver mount of an inspection assembly.

Referring now to FIGS. 3A and 3B, the base receiver mount 10 is shown demonstrating a projected view and a cut-away view, respectively. The first receiving latch 18 may be formed in a lower section 62 of the base receiver mount 10. The first receiving latch may be configured to receive the inspection apparatus 14 as shown in FIG. 1. The second engaging latch 30 may be formed in an upper section 64, which may be configured to receive the leveling rod 12 as shown in FIG. 1. The lower section 62 and the upper section 64 may be interconnected by a joining assembly 66, such as a coil or other flexible connector. The joining assembly 66 may comprise one or more flexible or spring members configured to couple the lower section 62 and the upper section 64. However, it should be noted that the base receiver mount 10 may function with or without the springs and hinging function depending on the configuration desired.

A hinge 68 may be configured to allow the base receiver mount 10 to bend to assist in the measurement of features that may be offset from a vertical measuring plane. An example of a feature offset from a vertical measuring plane is discussed later in reference to FIG. 7. Running parallel to the receiving chamber 17 inside of the lower section 62 are open channels 69 that may be configured to that allow waste water or storm water to flow out or be washed out of the devise.

Figure 4A:
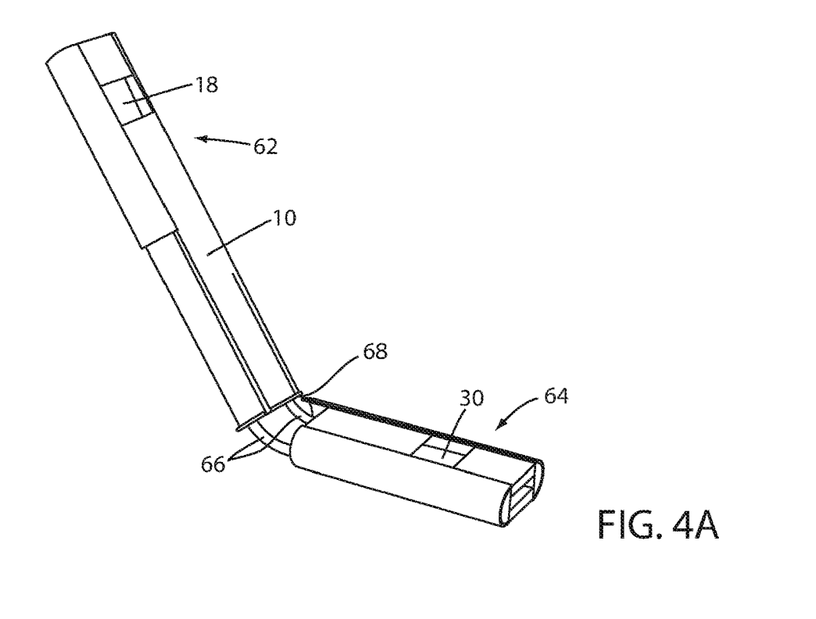
FIG. 4A is a perspective view of a base receiver mount of an inspection assembly.
Figure 4B:
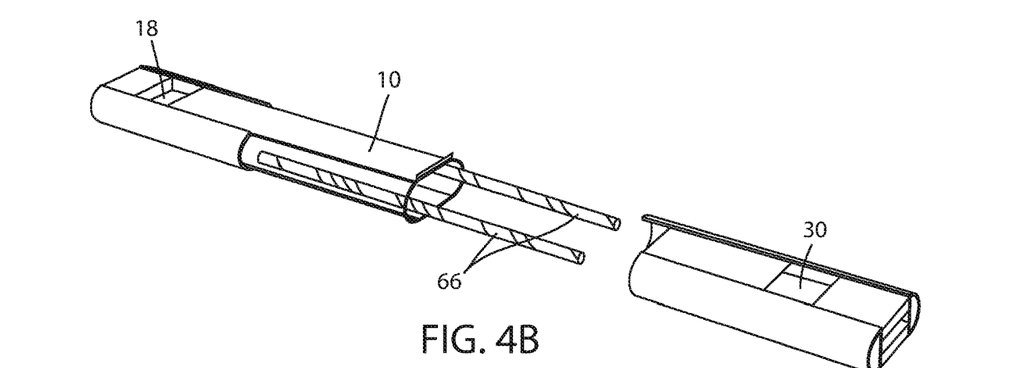
FIG. 4B is a perspective view of a base receiver mount of an inspection assembly.
Figure 4C:
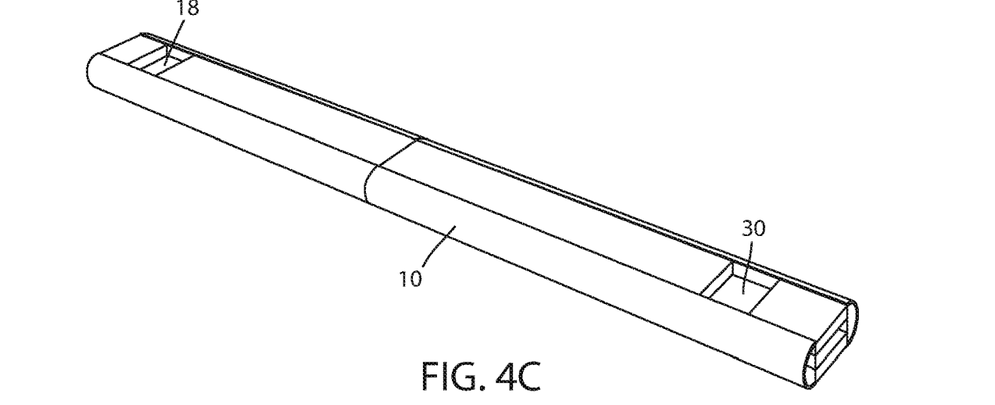
FIG. 4C is a perspective view of a base receiver mount of an inspection assembly.

Referring now to FIGS. 4A, 4B, and 4C; the elements discussed in reference to FIG. 3 are demonstrated displaying a hinging operation of the base receiver mount 10. FIG. 4A demonstrates a partial cutout view of the lower section 62 angled about the hinge 68. In this configuration, the lower section 62 is angled relative to the upper section 64. The joining assembly 66 may oppose the angle of the lower section 62 and the upper section 64 such that the base receiver mount 10 straightens the lower section 62 and the upper section 64 when a force is not applied to the lower section 62. An additional cutout view of the base receiver mount 10 is demonstrated in FIG. 4B to further demonstrate a plurality of joining assemblies 66 extending through the lower section 62 and the upper section 64 to provide for the spring force. FIG. 4C demonstrates the base receiver mount in a straightened configuration.

Figure 5:
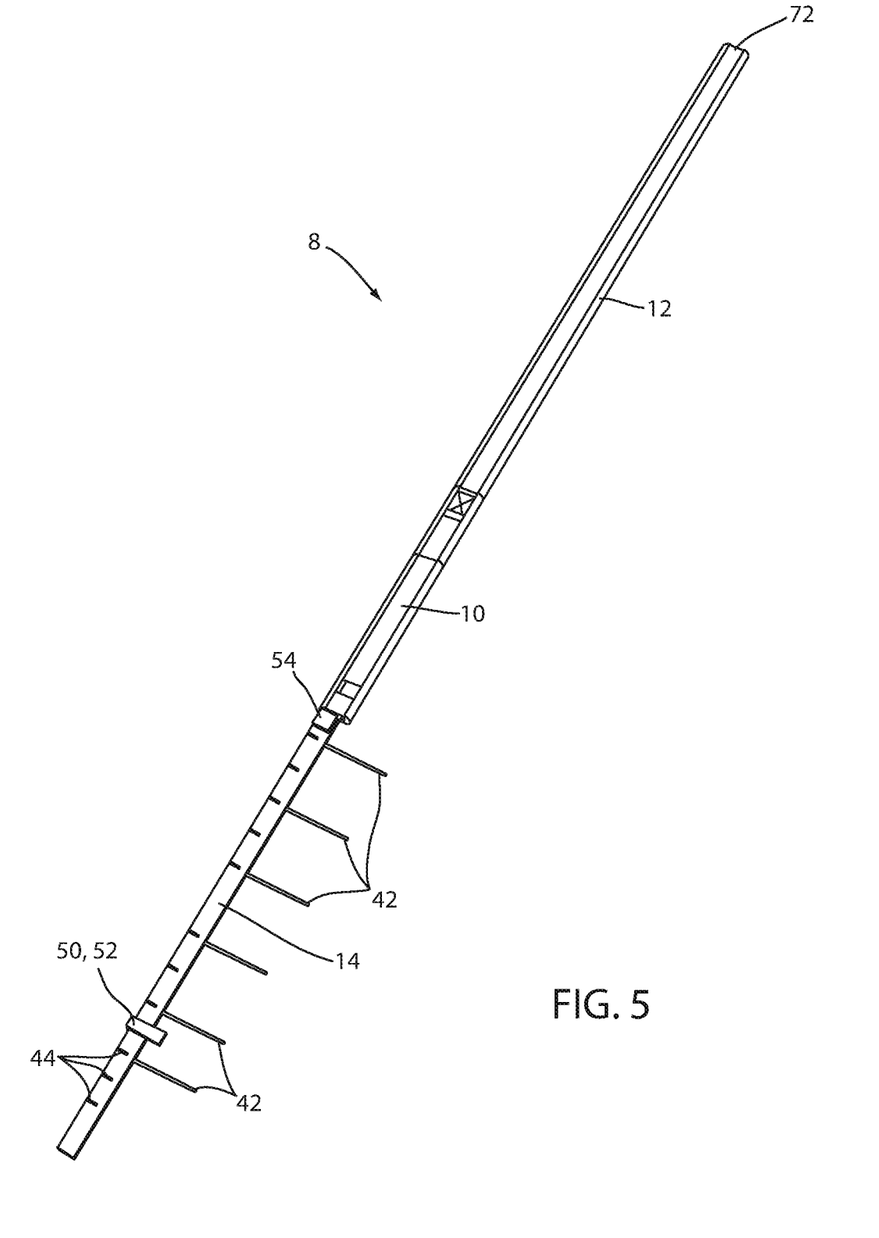
FIG. 5 is a perspective assembly view of an inspection assembly.

Referring now to FIG. 5 the inspection assembly 8 is shown in an assembled configuration providing for further details regarding the assembly configuration of the base receiver mount 10, the leveling rod 12, and the inspection apparatus 14. In this configuration, the inspection assembly is shown in an assembled form demonstrating the parts that may be utilized in an exemplary implementation. An angle measuring device 72 may be placed on the leveling rod 12 for the purpose of assisting in computing measurements. The angle measuring device 72 may be analog similar to a roof pitch indicator or digital similar to a Leica Disto D10 Electronic Distance Meter with Inclinometer.

Figures 6A, 6B:
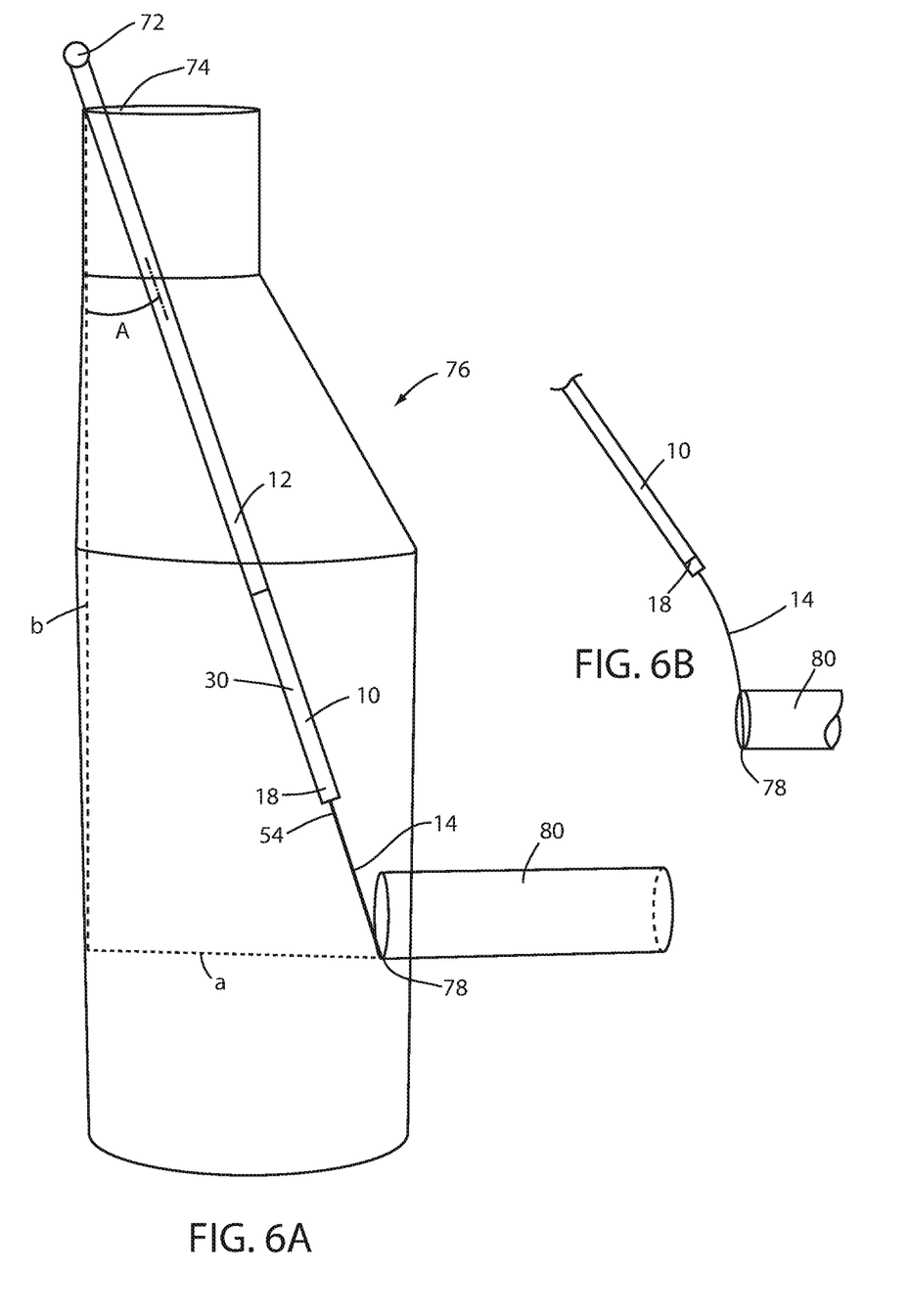
FIG. 6A is an environmental view of an inspection assembly utilized in a sewer structure.
FIG. 6B is a detailed environmental view of the inspection demonstrated in FIG. 6B.

Referring to FIGS. 6A, 6B, 7, and 8, the inspection assembly 8 is demonstrated in a typical sewer inspection scenario. In reference to FIG. 6, the inspection assembly 8 is shown being utilized to determine a vertical plumb distance measurement (b) from an access 74 of a sewer structure 76 to a pipe invert 78 of a pipe 80. As demonstrated, the inspection assembly 8 is extended at an extension angle (A) relative to a vertical direction due to a physical obstruction due to an eccentric configuration of the sewer structure 76. The inspection device may measure the extension angle (A) with the angle measuring device 72 as well as the hypotenuse (c) extending from the access 74 to the connection surface. In this configuration, the inspection apparatus may be configured to assist in identifying the hypotenuse (c) and the extension angle A such that the trigonometric relationship of a right angle may be utilized to determine the vertical plumb distance measurement (b). The Trigonometric relationship is shown as Equation 1.

$$b = c\,\cos(A) \qquad\qquad \text{Eq. 1}$$

As demonstrated in detailed view of FIG. 6B, the inspection apparatus 14 is demonstrated flexing or bending like a bow. In this configuration, a length of the inspection apparatus extending from the engaging end portion 16 may be configured to bend flex. In such a configuration, the inspection apparatus 14 may be formed of a semi-rigid material. The semi rigid material may correspond to a wood, metal, fiberglass, or various materials or combinations that may be operable to flex and return to a straightened configuration.

Figure 7:
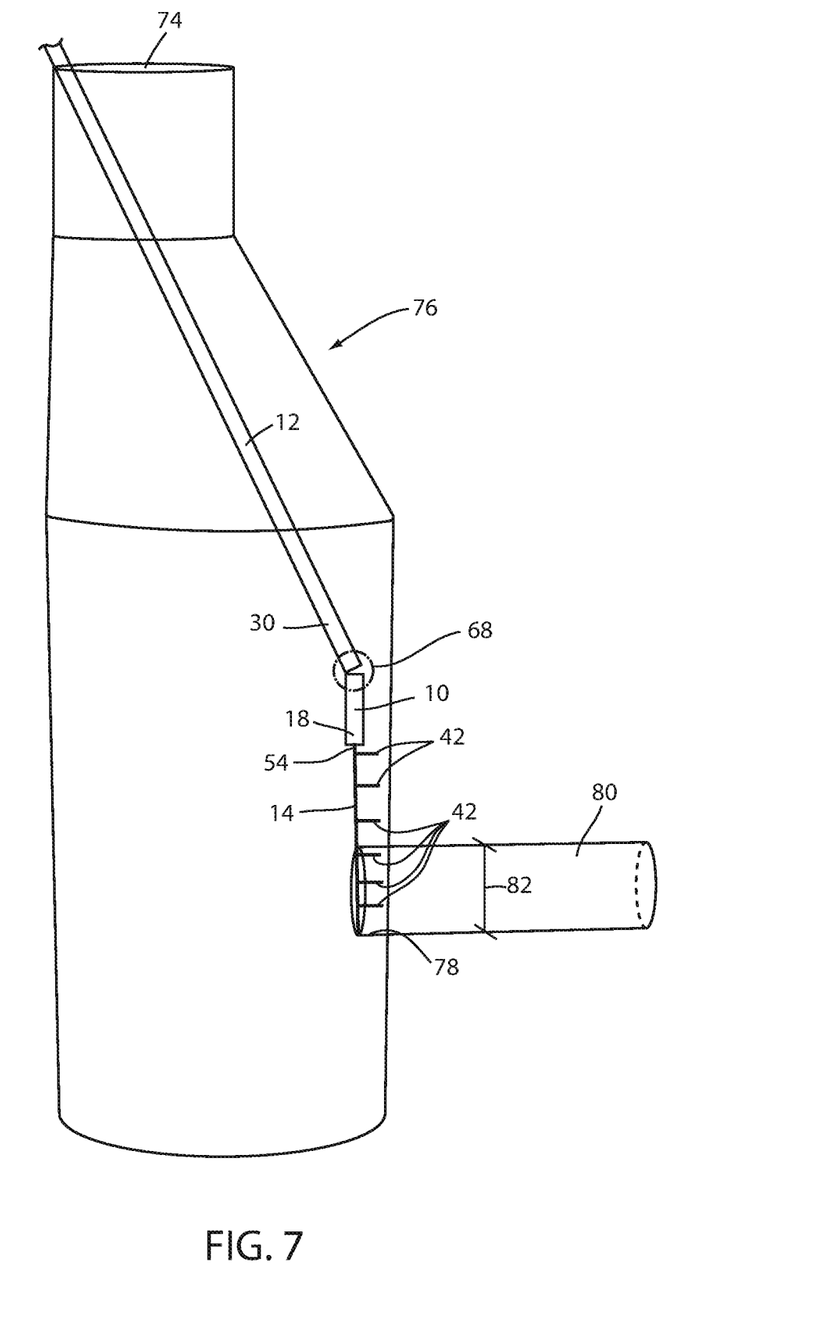
FIG. 7 is an environmental view of an inspection assembly utilized in a sewer structure.

Referring to FIG. 7 the inspection assembly 8 is shown demonstrating a method for measuring a diameter 82 of the pipe 80. The inspection assembly 8 is shown angled about the hinge 68 such that the inspection apparatus 14 is aligned substantially parallel to an interior wall 84 of the sewer structure 76. As demonstrated, the inspection apparatus 14 is aligned substantially parallel to an interior wall 84 despite the eccentric configuration of the sewer structure 76. Accordingly, an operator may align the inspection apparatus and view the graduation marks 44 and/or the size gauges 42 to identify the diameter 82 of the pipe 80. In this example, the inspection apparatus 14 is demonstrated having the luminary 54 attached to improve a visibility of the graduation marks 44 and/or the size gauges 42.

Figure 8:
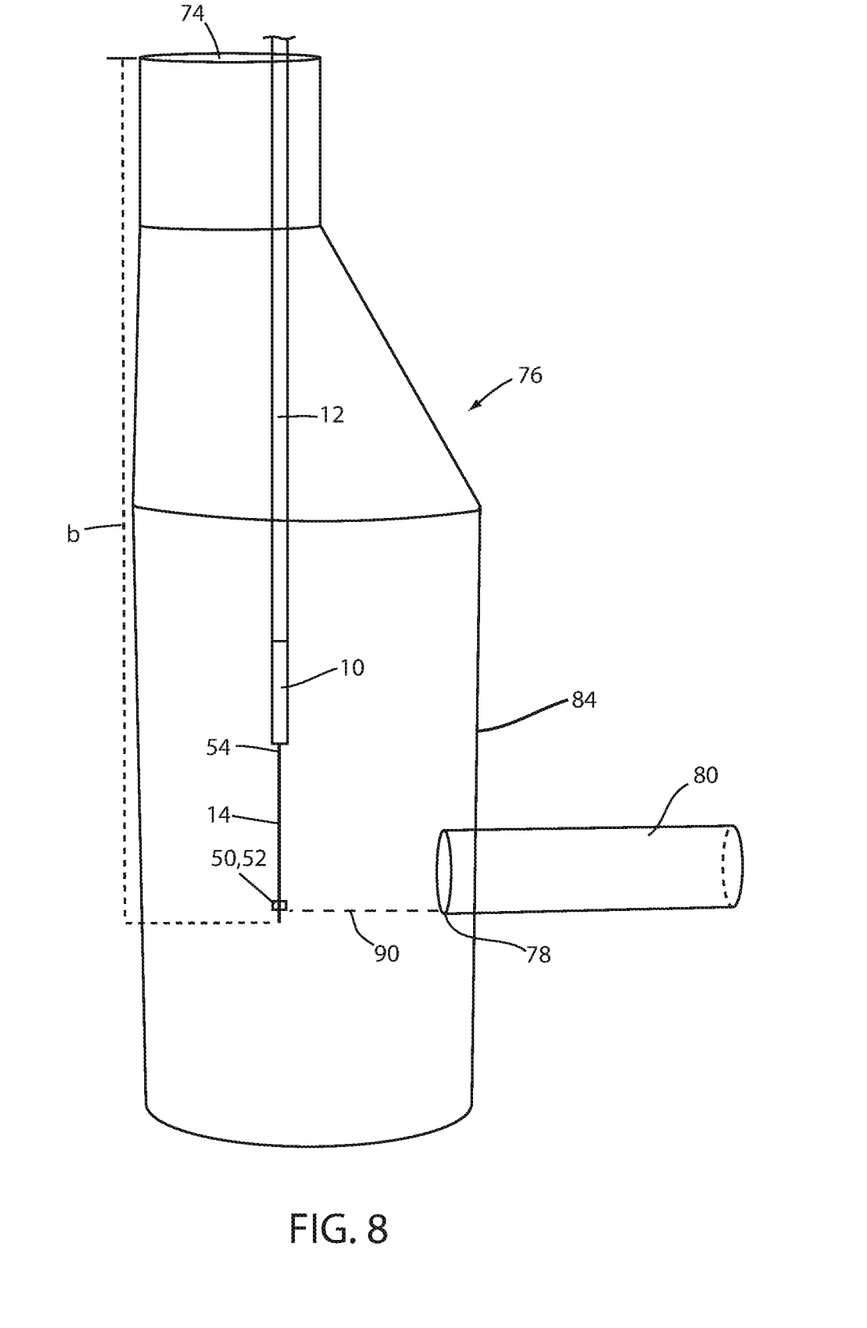
FIG. 8 is an environmental view of an inspection assembly utilized in a sewer structure in accordance with the disclosure.

Referring to FIG. 8 the inspection assembly 8 is shown demonstrating a method to determine a diameter or vertical depth measurement of the pipe invert 78 of the pipe 80. A visible line or mark 90 is shown emitted from the laser 50 projected on the interior wall 84. In this configuration, the laser 50 may or may not be self-leveling. In this configuration, an operator of the inspection assembly 8 may view the mark 90 to identify the vertical plumb distance measurement (b). If visual observation of mark was not possible due obstructions, the position of the mark 90 may also be identified with the camera 52 as discussed herein. As previously noted, the video and/or image data from the camera 52 may be communicated to an electronic device (e.g. a smartphone) to view the position of the mark and measure the vertical plumb distance measurement (b).

The invention has been described in an illustrative manner, and it is to be understood that the terminology which has been used is intended to be in the nature of words of description rather than of limitation. Obviously, many modifications and variations of the present invention are possible in light of the above teachings. For example, the Inspection/Measurement Apparatus can be adapted to any type of mounted apparatus and is not limited to the example given in the drawings. It is, therefore, to be understood that within the scope of the appended claim, the invention may be practiced otherwise than as specifically described. The invention is defined by the claim.

For purposes of disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An inspection assembly for inspection of a utility structure, the assembly comprising:
   a receiver mount having an elongated body extending from a proximal base portion to a distal base portion, the receiver mount forms:
      a first latch mechanism proximate the distal end portion; and
      a second latch mechanism proximate the proximal base portion; and
   an inspection apparatus extending along a longitudinal axis from a proximal inspection portion to a distal inspection portion and forming an engaging portion proximate the proximal inspection portion, the engaging portion configured to selectively couple to the latch mechanism, wherein the inspection apparatus comprises a plurality of protruding gauges extending substantially perpendicular to the longitudinal axis.

2. The inspection apparatus according to claim 1, wherein the second latch mechanism is configured to selectively couple to a leveling rod.

3. The inspection apparatus according to claim 1, wherein the receiver mount further comprises a hinge assembly disposed between an upper portion and a lower portion of the receiver mount.

4. The inspection apparatus according to claim 3, wherein the hinge assembly is configured to allow the upper portion to angle relative the lower portion in response to a force applied to the inspection apparatus.

5. The inspection apparatus according to claim 3, wherein the hinge assembly further comprises at least one joining assembly extending from the upper portion to the lower portion.

6. The inspection apparatus according to claim 5, wherein the joining assembly is configured to oppose a motion of the upper portion relative to the lower portion.

7. An inspection apparatus configured to selectively couple to a receiver mount of a survey inspection assembly, the inspection apparatus comprising:
   an elongated body extending along a longitudinal axis from a proximal inspection portion to a distal inspection portion;
   a plurality of protruding gauges extending approximately perpendicular to the longitudinal axis; and
   an inspection feature configured to slidably engage the longitudinal axis, wherein the inspection feature is configured to extend a visual reference of at least one measurement reference disposed on the inspection apparatus, wherein the inspection feature comprises a laser projection device configured to emit a laser light perpendicular to the longitudinal axis to extend the visual reference.

8. The inspection apparatus according to claim 7, wherein the laser corresponds to a self-level device configured to project a laser light parallel to a level plan perpendicular to gravity.

9. An inspection assembly for inspection of a utility structure, the assembly comprising:
   a receiver mount having an elongated body extending from a proximal base portion to a distal base portion, the receiver mount forming a latch mechanism proximate the distal base portion, the receiver mount comprising a hinge assembly configured to angle an proximal base portion of the elongated body relative to the distal base portion; and
   an inspection apparatus extending along a longitudinal axis from a proximal inspection portion to a distal inspection portion and forming the engaging portion proximate the proximal inspection portion, the engaging portion configured to selectively couple to the latch mechanism, wherein the inspection apparatus comprises a plurality of protruding gauges extending substantially perpendicular to the longitudinal axis.

10. The inspection assembly according to claim 9, wherein the hinge assembly is configured to allow the upper portion to angle relative the lower portion in response to a force applied to the inspection apparatus.

11. The inspection assembly according to claim 10, wherein the joining assembly is configured to oppose a motion of the proximal base portion to the distal base portion.

12. The inspection assembly according to claim 9, wherein the hinge assembly further comprises at least one joining assembly extending from the proximal base portion to the distal base portion.

13. The inspection assembly according to claim 9, further comprising a plurality of graduation lines disposed along the longitudinal axis of the inspection apparatus and configured to identify measurements along the longitudinal axis.

14. An inspection apparatus configured to selectively couple to a receiver mount of a survey inspection assembly, the inspection apparatus comprising:
   an elongated body extending along a longitudinal axis from a proximal inspection portion to a distal inspection portion;
   a plurality of graduation lines disposed on the elongated body configured to identify measurements along the longitudinal axis; and
   an inspection feature comprising a plurality of protruding gauges extending approximately perpendicular to the longitudinal axis, wherein the inspection feature is configured to extend a visual reference of at least one measurement reference disposed on the inspection apparatus.

15. The inspection apparatus according to claim 14, wherein the protruding gauges are configured to provide a visual reference of the graduation lines.

* * * * *